US012779786B2

(12) United States Patent
Faust et al.

(10) Patent No.: US 12,779,786 B2
(45) Date of Patent: Nov. 3, 2026

(54) 3D PRINTING WITH PARTIAL PART ROTATION AND REINFORCEMENT

(71) Applicant: Markforged, Inc., Waltham, MA (US)

(72) Inventors: Jessica Faust, Tyngsborough, MA (US); Joseph Roy-Mayhew, Watertown, MA (US); Benjamin Gallup, Acton, MA (US); Corey Hazeltine Walsh, Belmont, MA (US); Bruce David Jones, Sudbury, MA (US); Peter Kelly, Boston, MA (US)

(73) Assignee: MARKFORGED, INC., Waltham, MA (US)

( * ) Notice: Subject to any disclaimer, the term of this patent is extended or adjusted under 35 U.S.C. 154(b) by 350 days.

(21) Appl. No.: 18/494,212

(22) Filed: Oct. 25, 2023

(65) Prior Publication Data

US 2024/0140042 A1 May 2, 2024

Related U.S. Application Data

(60) Provisional application No. 63/419,827, filed on Oct. 27, 2022.

(51) Int. Cl.

| | |
|---|---|
| ***B29C 64/393*** | (2017.01) |
| ***B29C 64/232*** | (2017.01) |
| ***B29C 64/336*** | (2017.01) |
| ***B29K 307/04*** | (2006.01) |
| ***B29K 309/08*** | (2006.01) |
| ***B33Y 30/00*** | (2015.01) |
| ***B33Y 50/02*** | (2015.01) |

(52) U.S. Cl.
CPC .......... *B29C 64/393* (2017.08); *B29C 64/232* (2017.08); *B29C 64/336* (2017.08); *B33Y 50/02* (2014.12); *B29K 2307/04* (2013.01); *B29K 2309/08* (2013.01); *B33Y 30/00* (2014.12)

(58) Field of Classification Search
CPC ... B29C 64/393; B29C 64/232; B29C 64/336; B33Y 50/00; B33Y 50/02; B29K 2307/04; B29K 2309/08
USPC .......................................................... 700/119
See application file for complete search history.

(56) References Cited

U.S. PATENT DOCUMENTS

| | | | |
|---|---|---|---|
| 9,149,988 | B2 | 10/2015 | Mark et al. |
| 9,186,846 | B1 | 11/2015 | Mark et al. |
| 9,186,848 | B2 | 11/2015 | Mark et al. |
| 9,370,896 | B2 | 6/2016 | Mark |
| 9,539,762 | B2 | 1/2017 | Durand et al. |
| 9,579,851 | B2 | 2/2017 | Mark et al. |
| 9,688,028 | B2 | 6/2017 | Mark et al. |
| 9,694,544 | B2 | 7/2017 | Mark et al. |
| 9,815,268 | B2 | 11/2017 | Mark et al. |
| 10,000,011 | B1 | 6/2018 | Mark |
| 10,076,876 | B2 | 9/2018 | Mark et al. |
| 10,464,131 | B2 | 11/2019 | Mark |
| 10,800,108 | B2 | 10/2020 | Mark et al. |
| 10,814,558 | B2 | 10/2020 | Parangi |

(Continued)

*Primary Examiner* — Md Azad
(74) *Attorney, Agent, or Firm* — PEARL COHEN LLP

(57) ABSTRACT

A 3D printing apparatus and method prints a partial part, and continues to print the part after the partially-printed part has been rotated. Each partial printing operation may include reinforcement via application of one or more layers of continuous fiber. The rotation and continued printing of the partially-printed part allows for fiber orientation in different orientations for the printed part.

18 Claims, 12 Drawing Sheets

(56) References Cited

U.S. PATENT DOCUMENTS

| | | | | |
|---|---|---|---|---|
| 10,828,698 | B2 | 11/2020 | Mark | |
| 10,953,609 | B1 | 3/2021 | Mark | |
| 11,237,542 | B2 | 2/2022 | Mark et al. | |
| 2014/0361460 | A1* | 12/2014 | Mark | B29C 64/141 264/248 |
| 2016/0107379 | A1* | 4/2016 | Mark | B29C 64/188 700/98 |
| 2019/0009472 | A1 | 1/2019 | Mark | |
| 2020/0114422 | A1 | 4/2020 | Mark et al. | |
| 2020/0361155 | A1 | 11/2020 | Jones et al. | |
| 2020/0371509 | A1 | 11/2020 | Mark | |
| 2021/0078259 | A1* | 3/2021 | Tobia | B33Y 40/20 |
| 2022/0227057 | A1 | 7/2022 | Jones | |
| 2022/0266516 | A1* | 8/2022 | Korshikov | B33Y 70/10 |
| 2022/0332038 | A1* | 10/2022 | Celik | B29C 70/38 |
| 2023/0391003 | A1* | 12/2023 | Sweeney | B33Y 10/00 |

* cited by examiner

3D PRINTING WITH PARTIAL PART ROTATION AND REINFORCEMENT

CROSS-REFERENCE TO RELATED APPLICATION

This application claims the benefit under 35 U.S.C. § 119(e) of U.S. Provisional Patent Application No. 63/419,827, filed Oct. 27, 2022, and titled "3D PRINTING WITH PARTIAL PART ROTATION AND REINFORCEMENT," the entirety of which is incorporated herein by reference.

FIELD OF THE INVENTION

The invention relates to an apparatus and method for 3D printing with partial part rotation and reinforcement.

BACKGROUND OF THE INVENTION

Typically, fused-filament fabrication (FFF) 3D printing involves printing filament in the X-Y plane, in a layer-by-layer fashion that creates successive layers to form the part. Optionally, continuous fibers can also be printed to reinforce the parts greatly increasing mechanical properties in the X-Y plane. Apparatuses and methods for printing continuous fiber are described, for example, in U.S. Pat. Nos. 10,076,876, 9,579,851, 9,694,544, 9,370,896, 11,237,542, 9,186,846, 9,186,848, and 9,688,028, each of which is incorporated by reference herein in its entirety.

FFF may suffer from poor strength in the Z direction. That is, a filament used in FFF-style planar 3D printing generally has anisotropic strength, wherein strength in the Z-axis is weaker compared to its strength in the X-Y axis. This is due to interlayer adhesion between successive layers.

FFF continuous fiber parts can exhibit high strength in the X-Y directions, such as more than 700 MPa. However, these materials when formed in parts also exhibit very low strength in the Z-direction (e.g., about 7 MPa). Continuous fiber parts can also exhibit significantly lower Z-strength than a comparable Z-strength of plastic matrix parts (e.g., about 20 MPa). FIG. 11 illustrates an exemplary comparison between X-Y and Z tensile strengths for the plastic and composite filaments.

A length of fiber for a continuous fiber part is oriented perpendicular to the applied load. Composite stress concentrations are often concentrated at faces perpendicular to the applied load, that is for continuous fiber parts in the z-direction. Therefore, high stress concentrations and premature failure often present perpendicular to the applied load.

FFF with continuous fiber printing may suffer from poor strength in the Z direction to a greater relative extent. This is due to the high discrepancy in strength between continuous fibers (e.g., carbon fiber, glass fiber, and kevlar) and traditional thermoplastics (e.g., nylon, PET, PLA, PC, PEI). Continuous fibers may have strengths in the range of several thousand MPa, while plastics, even those reinforced with discontinuous fiber fillers, typically have strengths in the 50-150 MPa range. Thus even with ideal plastic interlayer adhesion, a 10× or greater difference in strength may exist between X-Y and Z direction.

Therefore, one constraint in conventional 3D printing, especially when utilizing continuous fiber printing, is that while produced parts may possess relatively strong tensile strength in bending or tension modes along the X and Y directions, the parts still have relatively weak tensile strength in the Z direction. 3D printed parts that require strength in multiple directions that may not be achievable with existing 3D printing methods.

Therefore, a need exists to print a 3D part that applies a filament to the partially-printed part in different orientations.

A need also exists to print a 3D part that is reinforced with continuous fiber oriented in different orientations.

SUMMARY OF THE INVENTION

One aspect of the present invention relates to an apparatus comprising at least one processor; and at least one memory, wherein the at least one memory stores computer-readable instructions which, when executed by the at least one processor, cause the processor to: control a 3D printer to perform a first 3D print operation to print one or more first layers of a part to form a partial part, the partial part being oriented at a first orientation; determine whether the partial part has been reoriented to a second orientation different from the first orientation; and after determining that the partial part has been reoriented to the second orientation, control the 3D printer to perform a second 3D print operation to print one or more second layers of the part on the partial part oriented at the second orientation.

Another aspect of the present invention relates to an apparatus comprising at least one processor; and at least one memory, wherein the at least one memory stores computer-readable instructions which, when executed by the at least one processor, cause the processor to: control a 3D printer to perform a first 3D print operation to print an alignment component; control the 3D printer to perform a second 3D print operation to print one or more first layers of a part to form a partial part, the partial part being oriented at a first orientation; control the re-orientation of the partial part to a second orientation, using the alignment component; and after determining that the partial part has been reoriented to the second orientation, control the 3D printer to perform a third 3D print operation to print one or more second layers of the part on the partial part oriented at the second orientation.

Yet another aspect of the present invention relates to a method comprising controlling a 3D printer to perform a first 3D print operation to print one or more first layers of a part to form a partial part, the partial part being oriented at a first orientation; determining whether the partial part has been reoriented to a second orientation different from the first orientation; and after determining that the partial part has been reoriented to the second orientation, controlling a 3D printer to perform a second 3D print operation to print one or more second layers of the part on the partial part oriented at the second orientation.

These and other aspects of the invention will become apparent from the following disclosure.

DETAILED DESCRIPTION OF THE PREFERRED EMBODIMENTS

The present invention relates to an apparatus and method of printing a part that provides fiber alignment along multiple planes. Such printing may be accomplished by, for example, rotating a partially-printed part before continuing printing, according to the present invention.

Printing in multiple directions via part rotation provides multiple benefits. For example, such printing may provide greater flexibility in producing a 3D part. In some instances, it is difficult to print in small corners or tight spaces without the print head undesirably contacting the part. One solution achieved by the present invention is to print a partial part, rotate the partial part, print a shell, and then rotate back and continue printing the base part. Of course, it will be recognized that the ability to use this functionality may depend on the part design. This approach may be combined with printing a continuous fiber shell (e.g., in different fiber orientation), which may further improve, for example, tensile strength, flexural strength, stiffness, wear resistance, and/or impact strength.

Another benefit of part rotation functionality improved strength by reinforcement in orientations other than the X-Y plane. For example, continuous fiber (e.g., carbon (CCF), glass, or kevlar fiber)) may be printed on the side of parts to reinforce and improve the Z-strength of plastic-only and fiber-reinforced 3D printed materials.

One benefit of this functionality is an improvement in Z-strength of 3D printed parts in a composite system. Based on experiments conducted by the inventors (such as that described below), printing CCF on the outside of the part in the Z-direction may improve the strength, e.g., from 6 MPa to >250 MPa.

3D Printer Apparatus

Figure 1A:
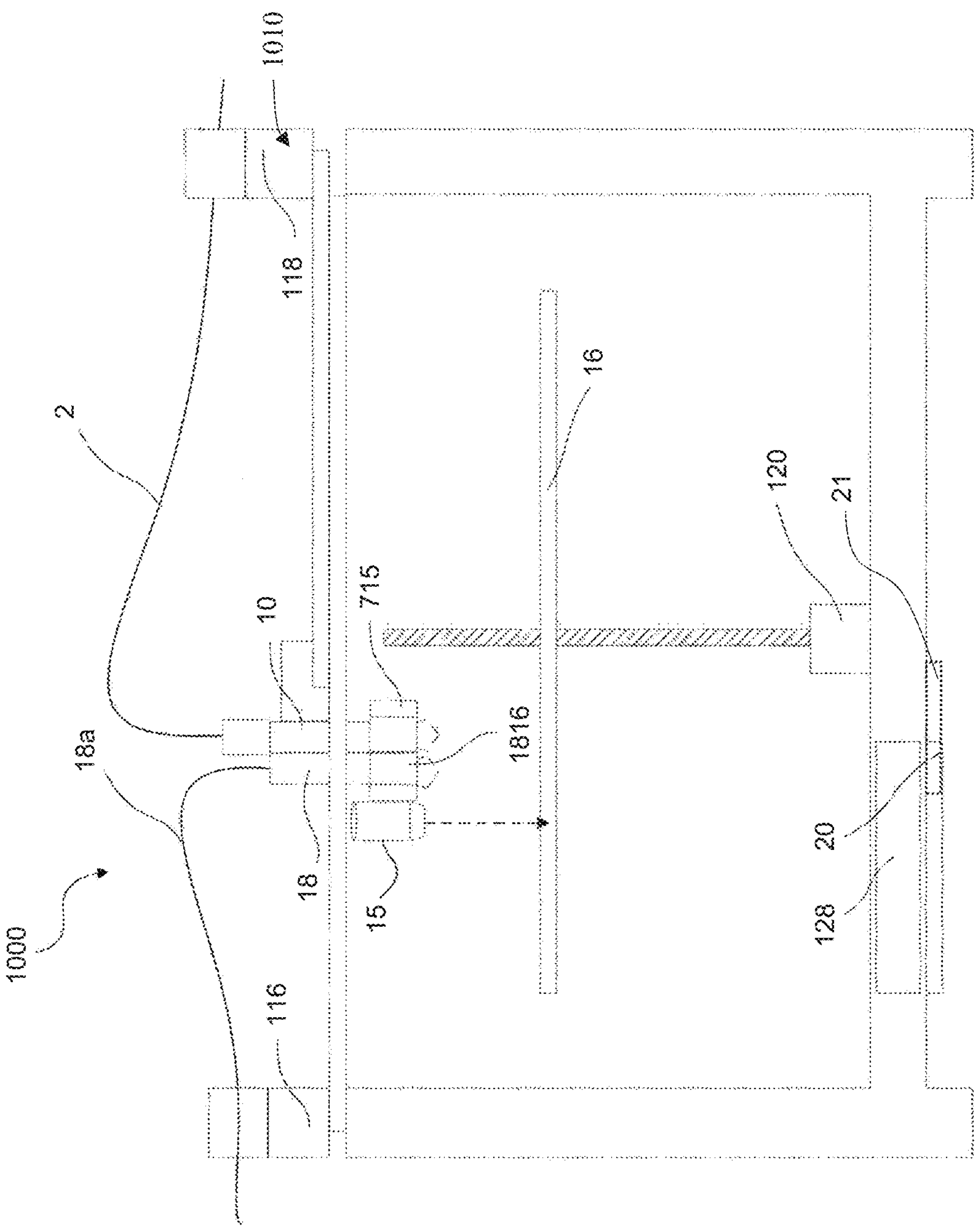
FIGS. 1A and 1B illustrate an apparatus, in accordance with one embodiment.
Figure 1B:
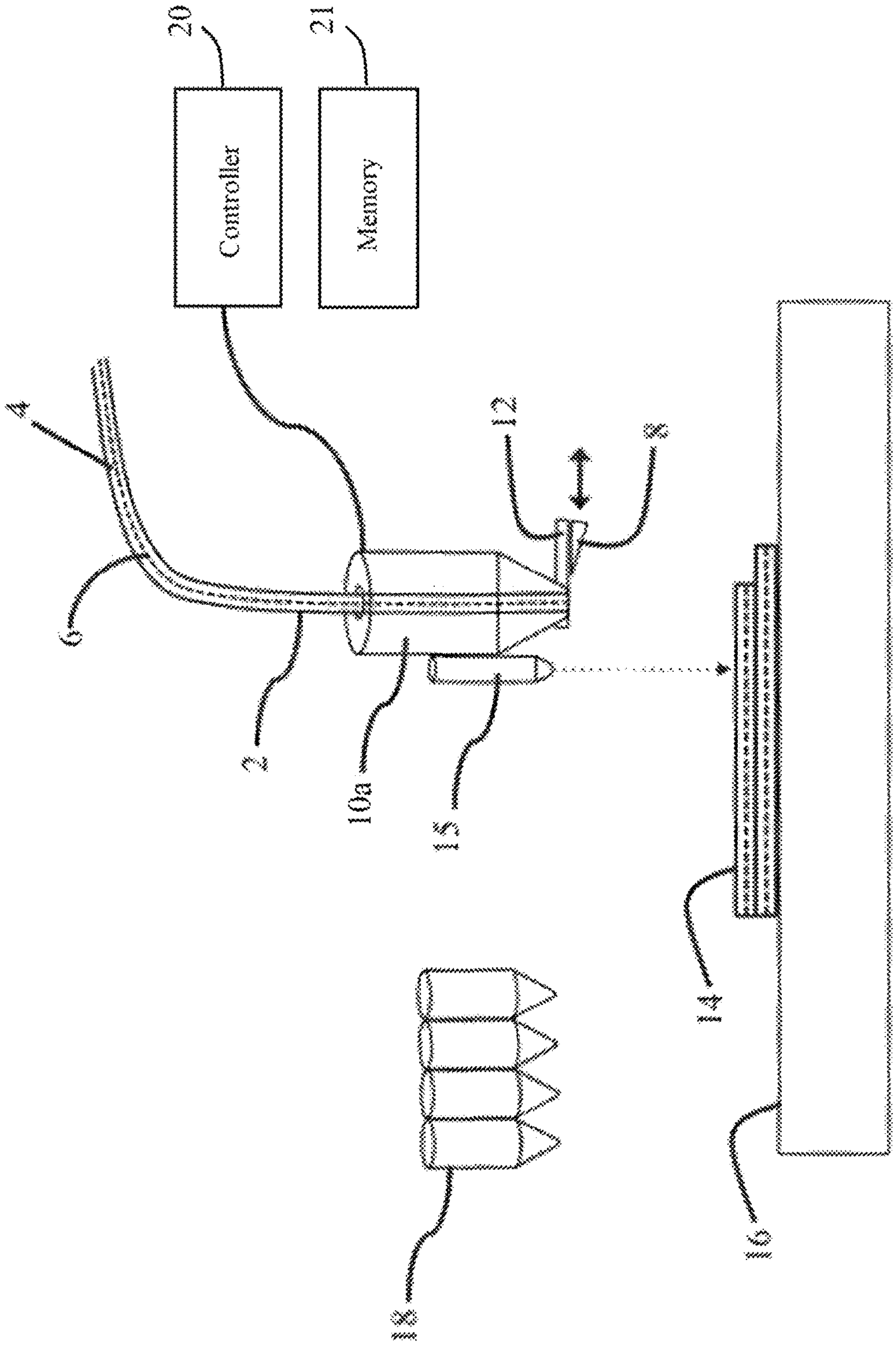

FIGS. 1A-1B illustrate an apparatus 1000 in accordance with one embodiment of the invention. The apparatus 1000 includes one or more controllers 20, display 128, one or more memories 21, and one or more print heads 10, 18. For instance, one head 10 may deposit a metal or fiber reinforced composite filament 2, and another head 18 may apply pure or neat matrix resin 18*a* (thermoplastic or curing), which may include, but is not limited to, a polymer or curable monomer and/or a polymer or curable monomer filled, e.g., with chopped carbon fiber, carbon black, silica, and/or aramid fiber. In the case of the filament 2 being a fiber reinforced composite filament, such filament (also referred to herein as continuous core reinforced filament) may be substantially void free and include a polymer or resin that coats, permeates or impregnates an internal continuous core (including, but not limited to, single, multi-strand, or multi-material). It should be noted that although the print head 18 is shown as an extrusion print head, "fill material print head" 18 as used herein includes optical or UV curing, heat fusion or sintering, or "polyjet", liquid, colloid, suspension or powder jetting devices (not shown) for depositing fill material. It will also be appreciated that a material bead formed by the filament 2 may be deposited as extruded thermoplastic or metal, deposited as continuous or semi-continuous fiber, solidified as photo or UV cured resin, or jetted as metal or binders mixed with plastics or metal, or are structural, functional or coatings. The fiber reinforced composite filament 2 (also referred to herein as continuous core reinforced filament) may be a push-pulpreg that is substantially void free and includes a polymer or resin 4 that coats or impregnates an internal continuous single core or multistrand core 6. The apparatus includes heaters 715, 1806 to heat the print heads 10, 18, respectively so as to facilitate deposition of layers of material to form the object 14 to be printed. A cutter 8 controlled by the controller 20 may cut the filament 2 during the deposition process in order to (i) form separate features and components on the structure as well as (ii) control the directionality or anisotropy of the deposited material and/or bonded ranks in multiple sections and layers. As depicted, the cutter 8 is a cutting blade associated with a backing plate 12 located at the nozzle outlet. Other cutters include laser, high-pressure air or fluid, or shears. The apparatus 1000 may also include additional non-printing tool heads, such as for milling, selective laser sintering (SLS), etc.

The apparatus 1000 includes a gantry 1010 that supports the print heads 10, 18. The gantry 1010 includes motors 116, 118 to move the print heads 10, 18 along X and Y rails in the X and Y directions, respectively. The apparatus 1000 also includes a build platen 16 (e.g., print bed) on which an object to be printed is formed. The height of the build platen 16 is controlled by a motor 120 for Z direction adjustment. Although the movement of the apparatus has been described based on a Cartesian arrangement for relatively moving the print heads in three orthogonal translation directions, other arrangements are considered within the scope of, and expressly described by, a drive system or drive or motorized drive that may relatively move a print head and a build plate supporting a 3D printed object in at least three degrees of freedom (i.e., in four or more degrees of freedom as well). For example, for three degrees of freedom, a delta, parallel robot structure may use three parallelogram arms connected to universal joints at the base, optionally to maintain an orientation of the print head (e.g., three motorized degrees of freedom among the print head and build plate) or to change the orientation of the print head (e.g., four or higher degrees of freedom among the print head and build plate). As another example, the print head may be mounted on a robotic arm having three, four, five, six, or higher degrees of freedom; and/or the build platform may rotate, translate in three dimensions, or be spun.

FIG. 1B depicts an embodiment of the apparatus 1000 applying the filament 2 to build a structure. In one embodiment, the filament 2 is a metal filament for printing a metal object. In one embodiment, the filament 2 is a fiber reinforced composite filament (also referred to herein as continuous core reinforced filament) may be a push-pulpreg that is substantially void free and includes a polymer or resin 4 that coats or impregnates an internal continuous single core or multistrand core 6.

The filament 2 is fed through a nozzle 10*a* disposed at the end of the print head 10, and heated to extrude the filament material for printing. In the case that the filament 2 is a fiber reinforced composite filament, the filament 2 is heated to a controlled push-pultrusion temperature selected for the matrix material to maintain a predetermined viscosity, and/or a predetermined amount force of adhesion of bonded ranks, and/or a surface finish. The push-pultrusion may be greater than the melting temperature of the polymer 4, less than a decomposition temperature of the polymer 4 and less than either the melting or decomposition temperature of the core 6.

After being heated in the nozzle 10*a* and having its material substantially melted, the filament 2 is applied onto the build platen 16 to build successive layers 14 to form a three dimensional structure. One or both of (i) the position and orientation of the build platen 16 or (ii) the position and orientation of the nozzle 10*a* are controlled by a controller 20 to deposit the filament 2 in the desired location and direction. Position and orientation control mechanisms include gantry systems, robotic arms, and/or H frames, any of these equipped with position and/or displacement sensors to the controller 20 to monitor the relative position or velocity of nozzle 10*a* relative to the build platen 16 and/or the layers 14 of the object being constructed. The controller 20 may use sensed X, Y, and/or Z positions and/or displacement or velocity vectors to control subsequent movements of the nozzle 10*a* or platen 16. The apparatus 1000 may optionally include a laser scanner 15 to measure distance to the platen 16 or the layer 14, displacement transducers in any of three translation and/or three rotation axes, distance integrators, and/or accelerometers detecting a position or movement of the nozzle 10*a* to the build platen 16. The laser scanner 15 may scan the section ahead of the nozzle 10*a* in order to correct the Z height of the nozzle 10*a*, or the fill volume required, to match a desired deposition profile. This measurement may also be used to fill in voids detected in the object. The laser scanner 15 may also measure the object after the filament is applied to confirm the depth and position of the deposited bonded ranks. Distance from a lip of the deposition head to the previous layer or build platen, or the height of a bonded rank may be confirmed using an appropriate sensor.

Various 3D-printing aspects of the apparatus 1000 are described in detail in U.S. Patent Application Publication No. 2019/0009472, which is incorporated by reference herein in its entirety.

3D Printing Operation with Rotation

Figure 2:
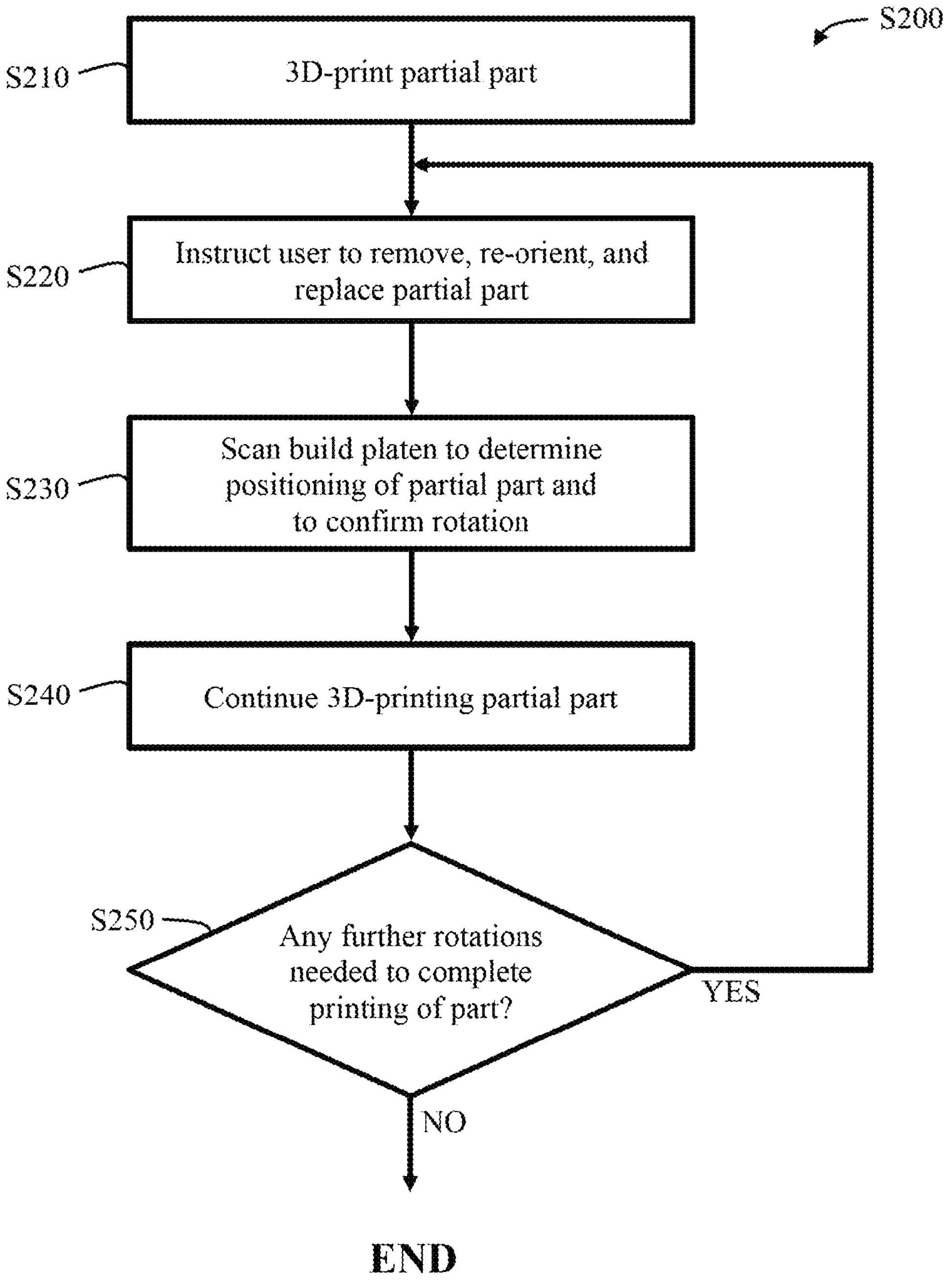
FIG. 2 is a flow chart for a 3D printing operation with rotation, in accordance with one embodiment.

FIG. 2 illustrates an operation S200 to print a part that includes rotating a partially-printed part. In step S210, the controller 20 initiates the 3D-printing operation of a part and prints a partial part.

In step S220, the controller 20 instructs the user to remove the partially-printed part from the build platen, re-orient the part to a predetermined different orientation (e.g., rotation by 90°), and place the partially-printed part back on the build platen. For example, a part may have been initially partially printed in the X-Y orientation, and in this step, the controller 20 instructs the user to rotate the part by 90° so that the Z-X orientation faces upward and is parallel to the X-Y plane.

The partially-printed part may be placed back on the build platen in a variety of different ways. In one embodiment, the partially-printed part is simply placed on the build platen (e.g., if the bottom surface of the part and/or the build platen is rough or textured to provide sufficient grip). In one embodiment, an adhesive (e.g., double-sided tape) or other fastening mechanism is used to retain the partial part on the build platen. In one embodiment, the build platen includes one or more alignment features, such as side or corner rail(s) (or other topographical feature), to receive a portion of the partially-printed part and aid in alignment. In one embodiment, one or more alignment features (e.g., alignment frame(s) or bracket(s)) is printed to aid in alignment and/or support the partially-printed part, prevent movement during printing, and allow easy removal. The user then utilizes the feature to align the partial part when placing the partially-printed part back on the build platen. In one embodiment, a custom build platen with clamps is used to retain the part. In one embodiment, a breadboard-style build platen with a variety of different mounting points (similar to an optical breadboard plate or a build plate used in machining) may be used.

In step S230, the controller 20 controls a sensor to scan the build platen to determine positioning of the partially-printed part and to confirm accurate rotation. For example, the scanning may be performed using the laser scanner 15 and/or a camera vision component. The scanning of the build platen may allow for compensation of any reorientation that is not exactly as specified (e.g., 90° rotation that is slightly off in reality). In this step, the controller may utilize the scan data to detect any warp in the partially-printed part.

In step S240, the controller 20 controls the apparatus 1000 to continue printing the partially-printed part. In one embodiment, the continued printing may compensate for any deviations determined in step S230 (e.g., one or more of translational deviations, rotational deviations, and warp)

In step S250, the controller 20 determines whether any further rotations are required to complete the printing of the part. If one or more further rotations are required, the operation returns to step S220. If no further rotations are required and the part has been fully printed, the operation ends.

3D Printing Operation with Rotation and Reinforcement

Figure 3:
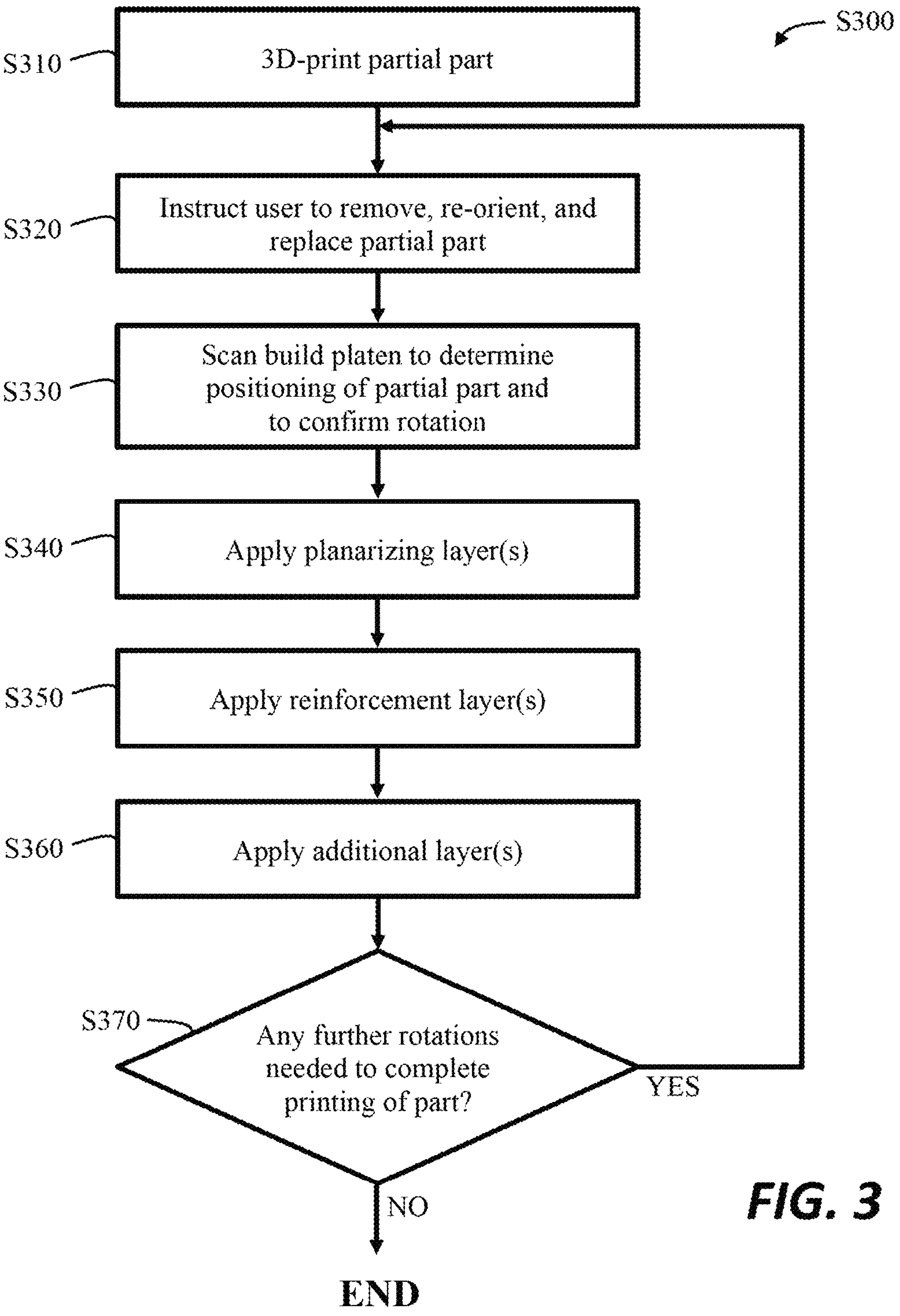
FIG. 3 is a flow chart for a 3D printing operation with rotation and reinforcement, in accordance with one embodiment.

FIG. 3 illustrates an operation S300 to print a part that includes rotating a partial part and reinforcement of the part (e.g., using CCF). FIGS. 4A-4H illustrate an example of a sequence in printing a part according to one embodiment of the present invention.

Figure 4A:
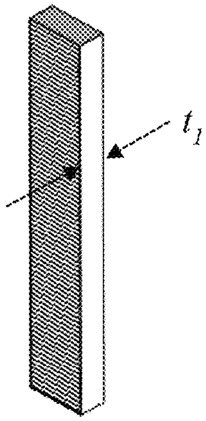
FIGS. 4A-4H illustrate an example sequence of printing of a part, in accordance with one embodiment.

In step S310, the controller 20 initiates the 3D-printing operation of a part and prints a partial part. FIG. 4A illustrates a printed partial part (which in this example, is a Z-beam) that is printed by forming layers in the Z direction.

Figure 4B:
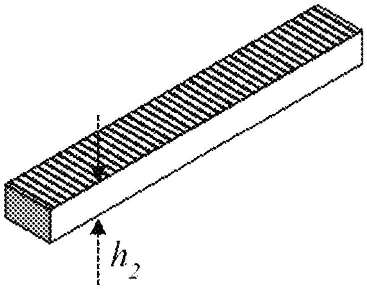

In step S320, the controller 20 instructs the user to remove the partially-printed part from the build platen, re-orient the part to a predetermined different orientation (e.g., rotation by 90°), and place the partially-printed part back on the build platen (similar to step S220). When placing the partially-printed part back on the build platen, the part is optionally adhered (e.g., glued) to the build platen 16. Then printing resumes. FIG. 4B illustrates the partially-printed part from FIG. 4A which has been rotated.

In step S330, the controller 20 controls a sensor to scan the build platen to determine positioning of the rotated partially-printed part and to confirm accurate rotation (similar to step S230). For instance, the controller 20 may utilize the laser scanner 15 and/or a camera vision system (not shown) as the sensor.

In optional step S340, the controller 20 controls the print head 10 and/or print head 18 to apply one or more planarizing layers on the rotated partially-printed part. The planarizing layer(s) provides a leveling of the current top surface, thereby allowing the generation of an exact Z-height and compensation for variations in Z-height due to warping or differences in coefficient of thermal expansion. The planarizing layer(s) may also provide easier adhesion to such top surface in subsequent printing of additional layers.

Figure 4C:
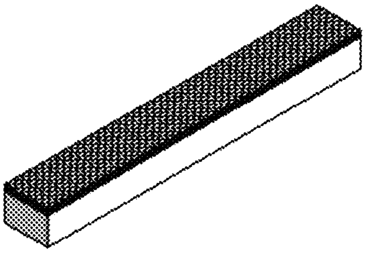

In one embodiment, the planarizing layer(s) may be formed as one or more plastic layers totaling between 100-250 m in height. FIG. 4C illustrates the rotated partially-printed part from FIG. 4B, on which one or more planarizing layers have been formed on the top layer (as rotated).

Figure 4D:
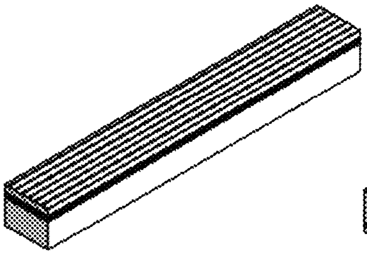

In step S350, the controller 20 controls the print head 10 and/or print head 18 to apply one or more reinforcement layers (e.g., CCF) on the rotated partially-printed part. In the case that one or more planarizing layers was applied in step S340, the reinforcement layer(s) may be applied on the planarizing layer(s). In the case that no planarizing layer was applied, the reinforcement layer(s) may be applied on the print material forming the partially-printed part. For example, the reinforcement layer(s) may reinforce the vulnerable Z-strength areas by providing a continuous fiber shell, allowing continuous fiber reinforcement in additional orientations beyond simply the X-Y orientation (from the perspective of the frame of reference of the original partially-printed part). FIG. 4D illustrates the partially-printed part from FIG. 4C, on which one or more reinforcement layers has been formed on the top layer (as rotated and including the optionally planarizing layer(s)).

In optional step S360, the controller 20 controls the print head 10 and/or print head 18 to apply one or more additional layers of print material on the rotated partially-printed part. For example, these additional layers may form the outer layer(s) of the final part. In one embodiment, the print material used for these additional layers is plastic and/or polymer, to provide a desired outer part surface quality. Depending on where the reinforcement is provided within the part, this step may involve the application of multiple layers to complete this portion of the part.

In step S370, the controller 20 determines whether any further rotations are required in order to complete the printing and/or reinforcement of the part. If further rotations are needed to continue printing the part, the operation returns to step S320. If no further rotations are needed to continue printing the part, the part is completed and the operation ends.

Figure 4E:
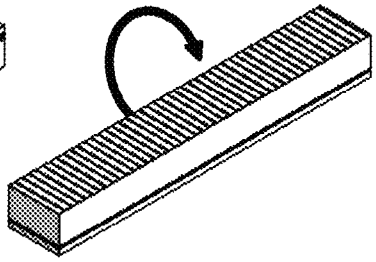
Figure 4F:
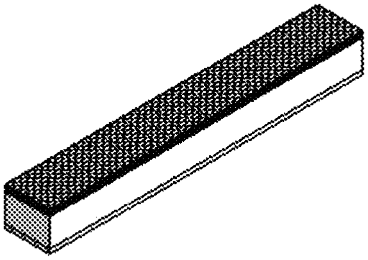
Figure 4G:
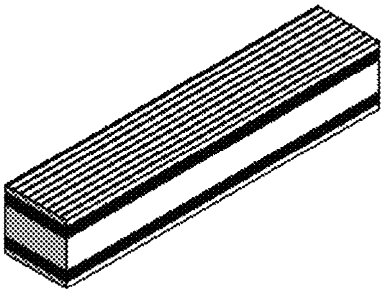
Figure 4H:
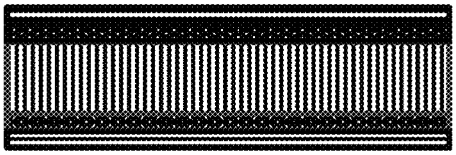

FIGS. 4E-4H illustrate the continuation of a printing operation for continuing the printing of the partially-printed part illustrated in FIGS. 4A-4D, where a further rotation is needed to complete the printing and the operation S300 returns from step S370 back to step S320. FIG. 4E illustrates the partially-printed part from FIG. 4D, in which the partially-printed part is again rotated (e.g., by 180 degrees) by performing another instance of step S320. FIG. 4F illustrates the partially-printed part from FIG. 4E, in which one or more planarizing layers is applied by performing another instance of step S340. FIG. 4G illustrates the partially-printed part from FIG. 4F, in which one or more reinforcement layers are applied by performing another instance of step S350. FIG. 4H illustrates a side view of the final printed part and its printed layers.

Alignment/Support Components

As described above, one or more alignment/support features may be employed to assist in accurately re-positioning the part after it is removed from and placed back on the build platen 16. Examples of such features are illustrated in FIGS. 5A-5D and will be described in further detail.

Figure 5A:
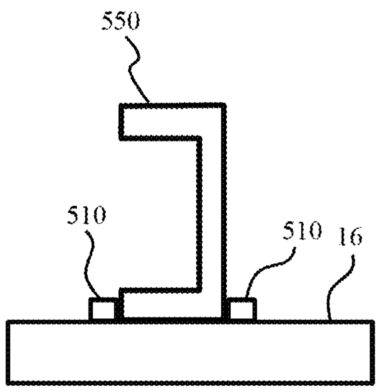
FIGS. 5A-5D illustrate alignment/support features for accurately re-positioning a part, in accordance with one embodiment.

FIG. 5A illustrates an embodiment in which the build platen is configured to include one or more alignment/support features. For example, the build platen 16 may be arranged to include alignment/support features 510 (e.g., side or corner rails) thereon to receive a re-positioned part 550 being printed. When a user re-positions the part 550 as instructed by the apparatus, the user places the part 550 back on the build platen 16 so as to abut one or more alignment/support features 510 on the build platen 16. In one embodiment, the alignment/support features 510 are permanently coupled (e.g., welded or adhered) to the build platen 16. In one embodiment, the alignment/support features are removably coupled (e.g., via screws, bolts, clips, etc.) to the surface of the build platen 16.

In one embodiment, the apparatus 1000 prints the alignment/support features 510 directly onto the build platen 16 prior to printing of the part 550, and the printed alignment/support features 510 are used for aligning and/or supporting the part 550 during printing of the part 550.

In one embodiment, the alignment/support features 510 are integrated with the surface of the build platen 16. For example, the build platen 16 may be configured as a custom-designed component having alignment/support features 510 specific to the dimensions and geometry of the part to be printed.

It will be recognized that while alignment/support features provided on the build platen may be used to align the part on the built platen, these features in some circumstances may not be able to sufficiently fix or hold the part in place during the printing process for certain part geometries (e.g., tall parts). Therefore, another approach to align/support the part may incorporate a clamping mechanism.

Figure 5B:
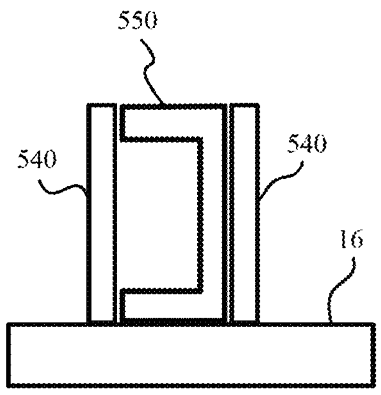

FIG. 5B illustrates an embodiment in which one or more alignment frames 540 (or an alignment bracket) is provided to retain the positioning of a partially-printed part 550 on the build platen 16 after the part 550 is rotated. Software may be employed for automated design of the alignment frame(s) 540 as a custom alignment bracket to constrain the part. The alignment frame(s) 540 may be, e.g., 2D or 3D hull negative.

A benefit of using alignment frame(s) is that the alignment frame(s) 540 provide full assistance in the user's efforts to re-orient the part 550, in that the alignment frame(s) 540, rather than the user's control, establishes proper alignment. For example, the user does not need to position or adjust the alignment frame(s) 540, but instead simply inserts the part 550 into the alignment frame(s) 540, which is configured to receive the part 550 in a specific orientation, thereby re-orienting the part 550. That is, the alignment frame(s) 540 are already in correct alignment with respect to the build platen 16, such that the inserted partially-printed part 550 is correctly oriented once inserted. Yet another benefit of using such an alignment frame 540 is that such frame 540 may abut/fix the part 550 in multiple locations to hold the part 550 steady during the printing process.

Figure 5C:
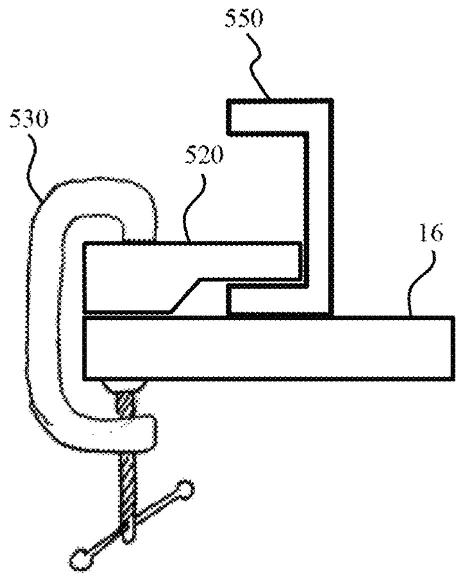

FIG. 5C illustrates an embodiment in which a build platen extension 520 is provided to retain the positioning of the partially-printed part 510 on the build platen 16 after the part 510 is rotated. The build platen extension 520 may be provided as a custom-designed component specific to the dimensions and geometry of the part 510, to be mounted (e.g., retained with a retention mechanism 530) to the build platen 16. The build platen extension 520 may include a geometry configured to mate with the geometry of at least a portion of the partially-printed part. For example, the build platen extension 520 may include a protrusion having a geometry configured to mate with that of a recess in the partially-printed part 550, such that the recess receives the protrusion to provide alignment. Conversely (or additionally), a build platen extension 520 may include a recessed portion having a geometry configured to mate with (e.g., receive and/or abut) that of a protrusion in the partially-printed part 510. In one embodiment, the build platen extension 520 is detachable from the build platen 16. However, it will be appreciated that the build platen extension 520 may alternatively be integrated with (or otherwise fixed to) the build platen 16.

While the retention mechanism 530 depicted in FIG. 5C is a clamp, it will be appreciated that any other type of retention mechanism 530 may be employed, including spring-loaded mechanisms, clips, etc.

Advantages of using the build platen 16 and/or a build platen extension 520 include a faster overall printing operation compared to using an alignment bracket (such as that described below), which may need to be separately 3D-printed. Software may also be employed for an automated design of a custom build platen extension that fits the specific geometry of the part to be printed. An additional benefit of using such a custom build platen extension 520 is that such extension 520 may further be designed to abut/fix the part at multiple locations to hold the part 550 steady during the printing process.

Any of the above-described build platen or extension components may include one or more of (i) a retention mechanism 530 for retaining the component(s) to the build platen 16 (as illustrated in FIG. 5C) and/or retaining the partial part to the component (not shown) and (ii) reference marks provided thereon (e.g., notches or protrusions) to define reference points that are locatable by a sensor (e.g., laser scanner) on the apparatus. For example, the build platen extension 520 (and/or reference marks) may provide partial assistance in the user's efforts to re-orient the part, in that both the user's control and the build platen extension (and/or reference marks) contribute towards establishing proper alignment. In one example, the user manually clamps the build platen extension onto the build platen 16 and while the build platen extension assists in aligning the part, there remains some free movement as the part is being moved to couple to the build platen extension.

Figure 5D:
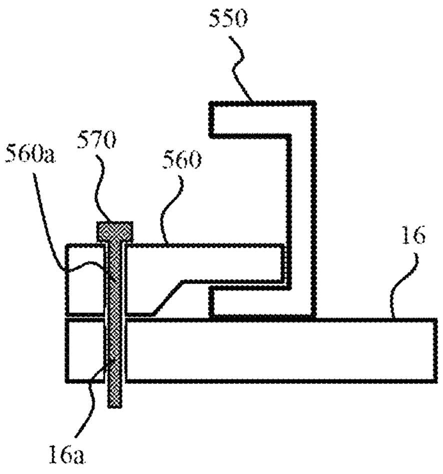

FIG. 5D illustrates an embodiment in which a build platen extension 560 is provided to retain the positioning of the partially-printed part 510 on the build platen 16 after the part 510 is rotated. The build platen 16 may include a retention component, such as one or more bolt holes **16*a* in the build platen 16, that is used towards retaining the build platen extension 560 to the build platen 16. In one embodiment, the build platen 16 is an optical breadboard with bolt holes 16*a*. It will also be appreciated that instead of (or in addition to) bolt holes 16*a*, the build platen 16** may include threaded bolt holes or through holes with pin-clip attachments. It will also be appreciated that other types of retention components other than holes may be utilized, such as protrusions, clips, clamps (e.g., built-in clamps), etc.

The build platen extension 560 may be similar to the build platen extension 520 described above with reference to FIG. 5C, except that the build platen extension includes a retention component that is used towards retaining the build platen extension 560 to the build platen 16. In one embodiment, the retention component is a bolt hole **560*a***.

Furthermore, in one embodiment, a bolt 570 is inserted through the bolt hole **560*a* of the build platen extension 560 and through the bolt hole 16*a* of the build platen 16, thereby securing the alignment between (and also coupling) the build platen extension 560 and the build platen 16**.

In one embodiment, a build plate (e.g., having a circular or other profile) may be 3D-printed as a solid or hollow frame and configured with a custom geometry to fit and receive the partially-printed part. The build plate may be configured allow for rotation in multiple axes, thereby also rotating the partially-printed part contained therein. Following the rotation of the build plate, printing of the partially-printed part resumes.

Experimental Results

The benefits of adding reinforcement shells/layers to a printed part include an increase in strength, stiffness, toughness, and/or hardness in the Z-direction. Additional potential benefits include, but are not limited to, improved thermal conductivity, electrical conductivity, electrical dissipation, radiative emissions or absorption, aesthetics, sensing, chemical resistance, flame resistance, etc.

It will be appreciated that while adding reinforcement shells to simple parts provided these benefits, the inventors also experimented as to whether this approach likewise provided improvements for complicated parts with complex features.

Figure 6A:
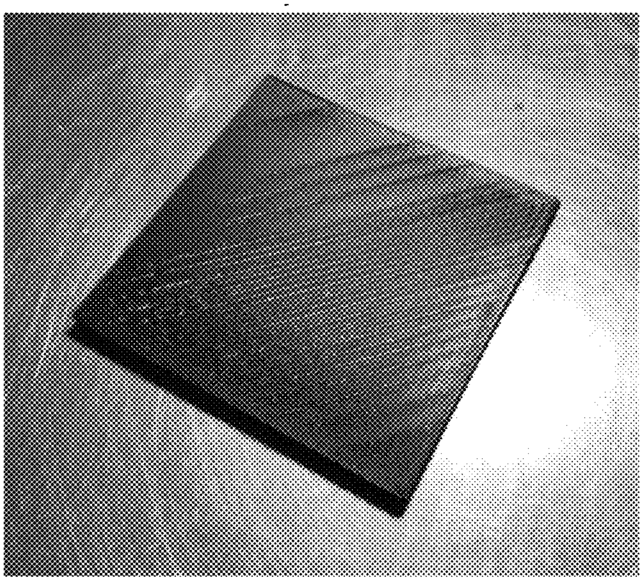
FIGS. 6A-6C illustrate the results of an experiment to compare the strength of a part with and without reinforcement.
Figure 6B:
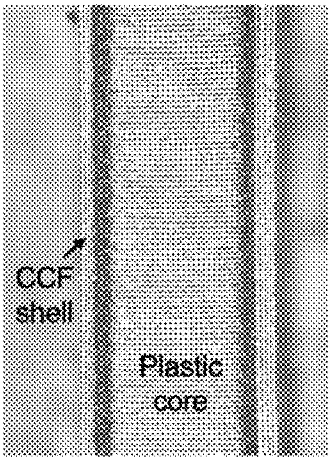
Figure 6C:
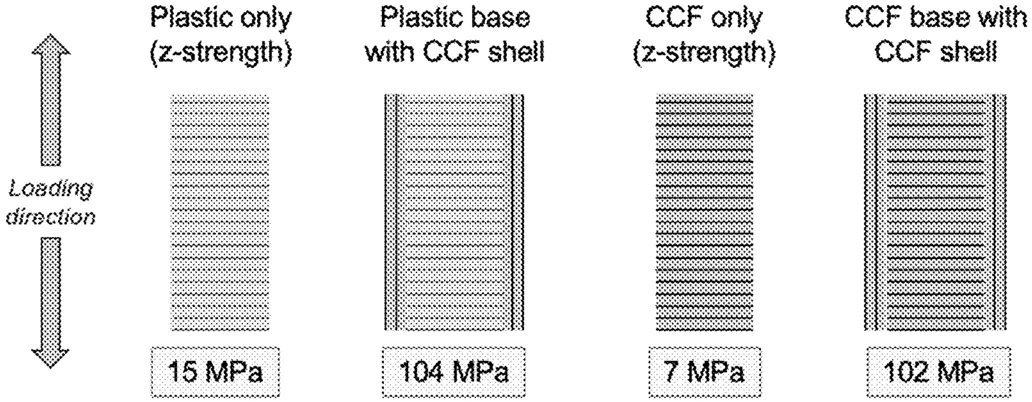

FIGS. 6A-6C illustrate a first experiment conducted to compare the strength of a part that is printed and reinforced based on different approaches. In this experiment, the part that was used is a simple plate, as illustrated in FIG. 6A. During this experiment, different plates were printed, including plates formed with a polymer core and plates formed with a CCF core, and formed with and without CCF reinforcement shells applied to the plates. This experiment provides a more focused analysis of plastic Z-strength and fiber Z-strength improvements. For the plates provided with reinforcement, continuous fiber shells were printed on both sides of the plate with two fiber layers on each side, as depicted in FIGS. 6A and 6B.

The results from strength-testing of these plates are shown in FIG. 6C. As indicated in the figure, for the plate formed using the plastic-filament core, the addition of the CCF reinforcement shells provided an increase in strength in the Z-direction from 15 MPa to 104 MPa. And for the plate formed using the CCF-filament core, the addition of the CCF reinforcement shells provided an increase in strength in the Z-direction from 7 MPa to 102 MPa.

Figure 7A:
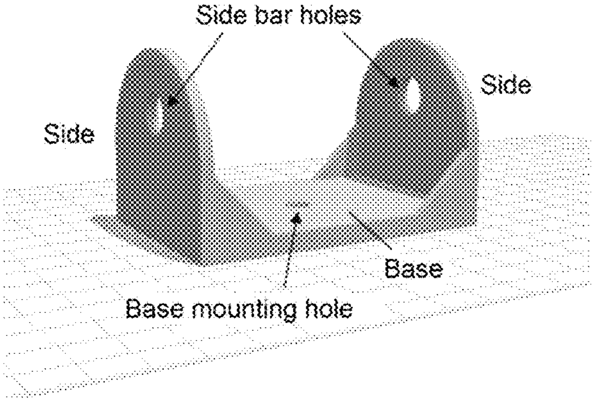
FIGS. 7A-7C illustrate the results of an experiment to compare the strength of a part with and without reinforcement.
Figure 7B:
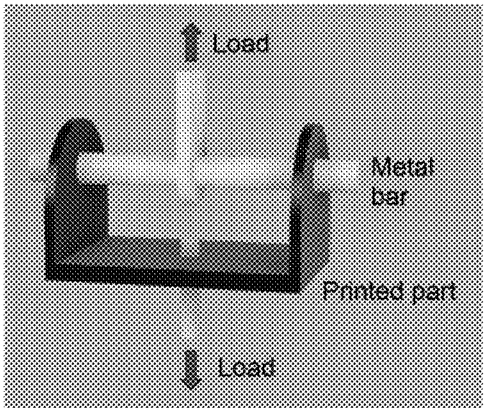
Figure 7C:
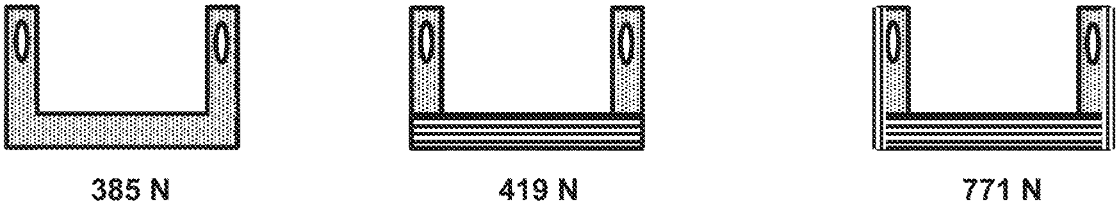

FIGS. 7A-7C illustrate a second experiment conducted to compare the strength of a part that is printed and reinforced using several different approaches. The example part in this experiment is a 3D bracket, illustrated in FIG. 7A, which is more geometrically complex compared to the simple plate used in the first experiment.

In this experiment, the brackets were printed in the X-Y orientation (as illustrated in FIG. 7A) as a hinge assembly with three main features (i) a base U-shaped hinge with a bottom plate and two vertical side plates, (ii) a hole centered along the bottom plate, and (iii) two holes along the side plates. This exemplary part may require strength in more than one direction, and may be difficult to print with conventional 3D printing technologies. Nonetheless, the part has flat faces (e.g., along the side faces) in which a CCF shell may be applied to reinforce the part.

In addition, as a bracket, the example part can be easily tested for strength by providing a metal bar that spans across the center and through the two vertical holes, as illustrated in FIG. 7B. The tensile grips attach and load the bracket, and the bottom plate of the bracket is loaded in flex while the two sides are loaded in tensile (see FIG. 7B).

There are various approaches available in printing the part for comparison in the experiment. A first approach involves 3D printing the part in an X-Y orientation, including variants with and without reinforcement. Under this approach, the sides loaded in tensile are reliant on the part's Z-strength, and therefore have relatively low strength.

A second approach involves 3D printing the part in an Z-X orientation, including variants with and without reinforcement. Under this approach, the flexural base is dependent on Z-strength and has low strength. While this print orientation may be preferable to printing in the X-Y direction under the first approach, this approach may only provide for reinforcement of one side, rather than both sides.

A third approach involves 3D printing the part in an X-Z direction, including variants with and without reinforcement. This approach achieves similar plastic strength in the sides and the base as the second approach, but does not support continuous reinforcement. As such, the overall strength may not be sufficient.

A fourth approach involves printing the base and side components separately, and then manually coupling the two components together afterwards (as described below in operation S900). This approach may overcome poor strength issues suffered in the previously-described approaches. However, the approach requires an extra assembly step and therefore may not be universally suitable.

A fifth approach involves 3D printing the part that incorporates rotation of the partially-printed part, according to the present invention. By having access to each side through the rotation(s), reinforcement may be provided on both the base and the sides. The entire part also may be printed at once as a single component, rather than as separate components which requires assembly as in the fourth approach. Additionally, the printing of the entire part provides improved thermal bonding, thereby providing an advantage over the fourth approach where the coupling of the base and the sides may require adhesives or fasteners that reduce thermal bonding. One example of printing the bracket under this approach may include printing one side and reinforcing that side, rotating the partial part, printing an adjacent side and reinforcing that side, rotating the partial part, and printing the remaining side and reinforcing that side.

As explained above, the testing of these approaches involved loading the respective bracket with a single bar through the center of the bottom and a cross bar at the top through two vertical holes, as illustrated in FIG. 7B. Once loaded in this manner, the two sides are loaded in tension and the bottom is loaded in flex.

In the case that printing of the bracket is limited to the X-Y orientation, continuous fiber reinforcement may only be placed in the bottom, and the sides lack reinforcement. Printed sides were reinforced with continuous fiber shells in accordance with the methods disclosed herein FIG. 7C illustrates the results of the experiment. The load capability for the unreinforced reference bracket (shown on the left of the figure) was 385 N. The load capability for the bracket formed using the first approach described above, with added CCF reinforcement on the base (shown in the middle), was 419 N. The load capability for the bracket formed using the fifth approach described above, where both the bottom and sides are reinforced with CCF, was 771 N. The testing involved reporting the loads rather than strength, due to the more complicated geometry of the bracket and difficult conversion to stress values.

Figure 8:
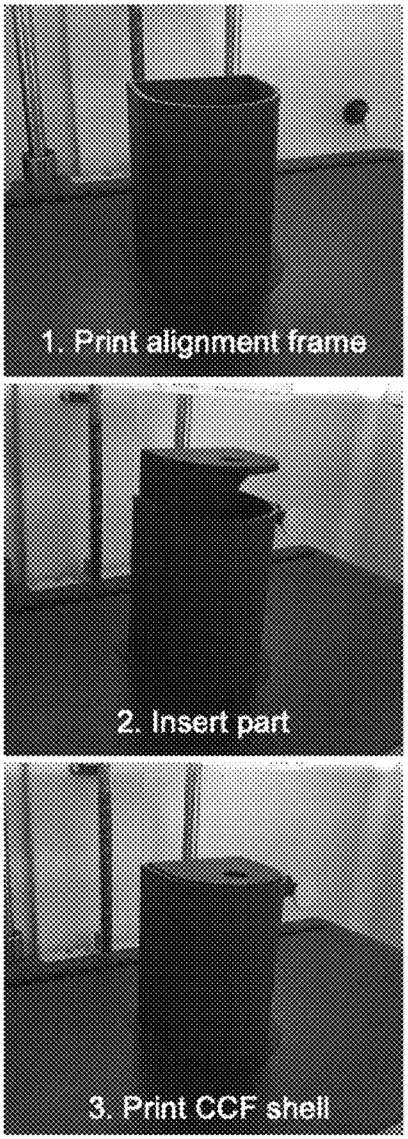
FIG. 8 illustrates a sequence of forming and using an alignment frame to print a part, in accordance with one embodiment.

FIG. 8 illustrates an example alignment frame that may be provided for assisting in rotation of the example bracket part from FIGS. 7A-7C. As shown in FIG. 8, the alignment frame may first be printed. Then, the partially-printed part is inserted into the cavity of the alignment frame. The alignment frame is configured such that the partially-printed part is only insertable in one orientation. After the partially-printed part is inserted, the reinforcement layer(s) are printed.

One aspect of the invention relates to compensation for warp when applying reinforcement. For example, some part geometries may warp if reinforcement shells are added in an unsymmetrical fashion (e.g., a flat plate may begin to warp once the shell is added to one side). The warping may, for example, be caused by differences in coefficient of thermal expansion (CTE) between the base part and the CCF shell, from non-symmetrical or offset part geometries (e.g., non-symmetric sandwich panels or inward warping of tall vertical sides), or based on other causes.

A first approach to reducing or eliminating warping during the application of a reinforcement shell is to keep the part warm until both shells have been added and/or using parts with a sparse isotropic infill (e.g., gyroid).

A second approach to compensate for part warp (e.g., especially if the warping is only a small amount) is to print a thicker planarizing plastic layer (e.g., 200 μm initial plastic layer instead of a 100 μm plastic layer that may be more sensitive to warp) as part of step S340 described above. Additionally, a smaller layer of polymer may be added in "low spots" to create a flat surface prior to depositing the CCF shell layers (e.g., as part of step S340 described above). For instance, the laser scanner 15 may be used to scan the top surface of the partially-printed part and create a topographical profile and identify any warping or "low spots" on the top surface.

Another aspect of the invention relates to forming a part by separately printing components of a part, each component having its own fiber orientation, and then combining the components as the complete part. That is, out-of-plane fiber inserts are separately printed and combined to form a part. In particular, different components of the part may be separately printed in multiple pieces, each component containing reinforcement (e.g., CCF). After the separate components are printed, the components are mechanically combined, resulting in a complete part where printed layers and the fibers they contain lie in multiple planes in the final assembly. This approach allows the final parts to possess high strength in all axes. Notably, this approach improves Z-axis strength, which is a significant drawback of conventional FFF-style 3D printing. This approach also allows for customization of part strength characteristics for target loads.

As one example, a part may be formed by printing a rectangular pin containing multiple fiber layers, each aligned along the X-Y plane. For example, the dimensions of the pin may be 10 cm (X)×2 cm (Y)×1 cm (Z). The pin is removed from the build platen, and another part is printed which contains a negative cutout of the pin with a long-axis in the Z direction (e.g., contains a 2 cm (X)×1 cm (Y)×10 cm (Z) void) and is printed as customary based on successive layers in the X-Y axis. Then, the pin is inserted into the void and mechanically coupled (e.g., with an adhesive). The resulting final part would contain fibers in both the X-Y and Y-Z planes, as opposed to solely in the X-Y plane in the case of conventional 3D printing.

Figure 9:
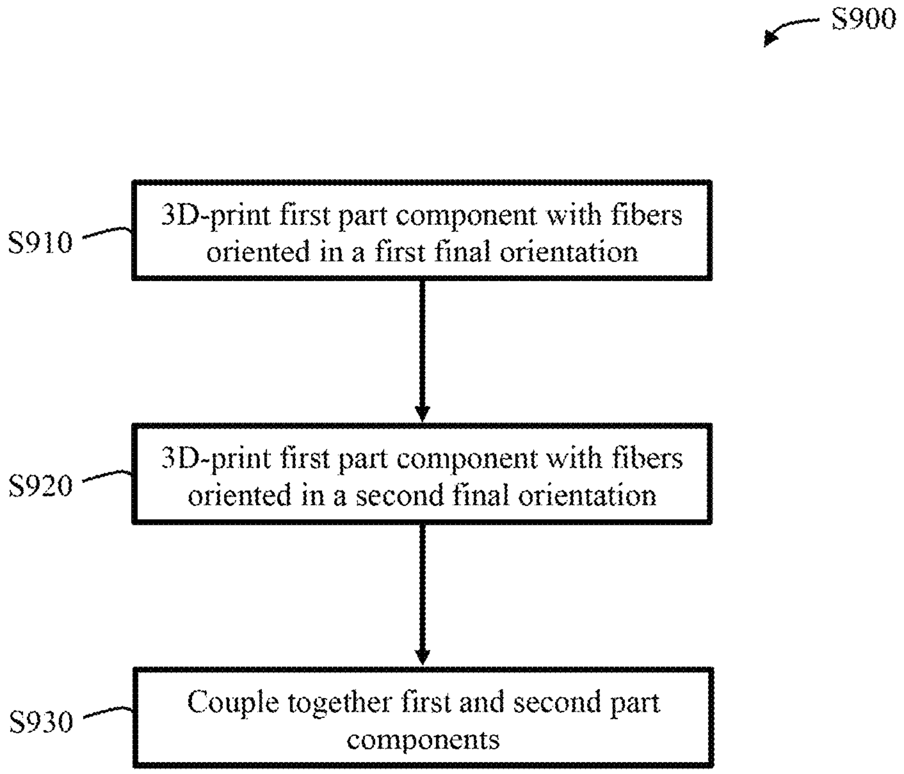
FIG. 9 is a flow chart for a 3D printing operation with coupling of parts, in accordance with one embodiment.

FIG. 9 illustrates an operation S900 to 3D-print a part with different portions thereof having different fiber orientations. In step S910, the apparatus 1000 3D-prints a first part component with fibers oriented in a first final orientation. In step S920, the apparatus 1000 3D-prints a second part component with fibers oriented in a second final orientation different from the first orientation. One of the first part component and the second part component may represent an insert component and the other component may include a negative cutout profile corresponding with the profile of the other part component so as to receive the insertion of the other part component.

In step S930, the apparatus 1000 instructs a user to couple together the first part component and the second part component. For example, the apparatus 1000 may display instructions and illustrations on a display as to the coupling process, including the orientation of each part component relative to the other part component. The coupling may be accomplished by, e.g., an adhesive or by mechanical coupling.

Figure 10A:
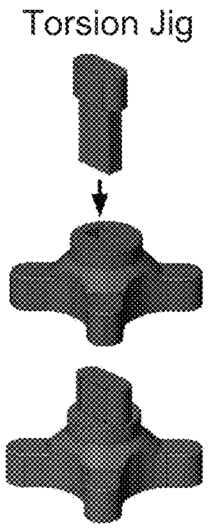
FIGS. 10A-10C illustrate example parts that may be formed by coupling, in accordance with one embodiment.
Figure 10B:
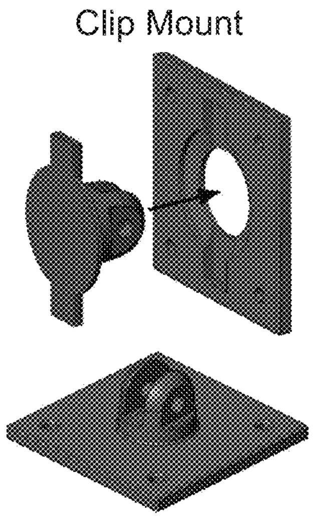
Figure 10C:
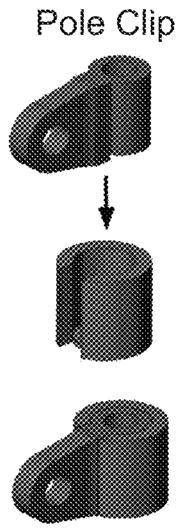
Figure 11:
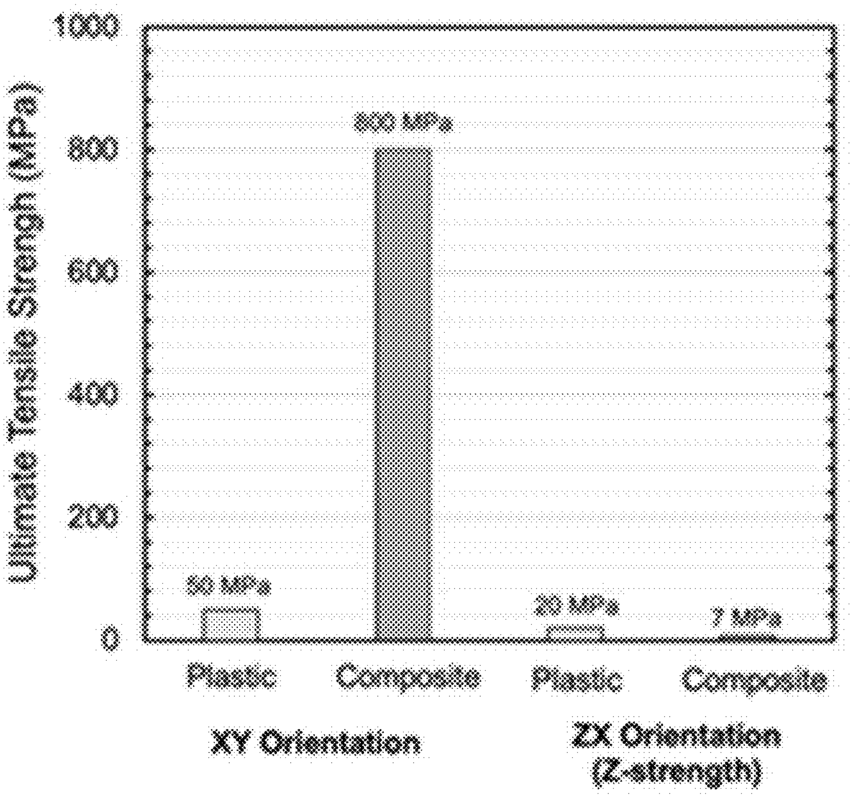
FIG. 11 Prior Art
FIG. 11 illustrates an exemplary comparison between X-Y and Z tensile strengths for the plastic and composite filaments.

FIGS. 10A-10C illustrate various examples of parts that may be printed using operation S900 and which may benefit from fibers oriented along multiple planes. FIG. 10A illustrates a torsion jig, in which a base component is separately printed from an insert component. FIG. 10B illustrates a clip mount, where a base plate is separately printed from the clip component. FIG. 10C illustrates a pole clip, where the concentrically-outer cylindrical mount is separately printed from the concentrically-inner clip component. Each of these parts requires strength along multiple directions, which is achieved by a printed part having fibers oriented along multiple planes such as using the operation S900.

Additional functionality that may be combined with the operation S900 includes:

- using multiple inserts
- using complicated insert geometry to selectively reinforce parts according to part loading
- using inserts that may mechanically interlock
- using adhesives, i.e., polymer residual stresses to create mechanical interlock (plastic part shrinks around CCF insert)—annealing
- using both interlocks and adhesives to hold in place during part loading
- using knowledge of CTE and/or swelling to design a tight fit mechanical interlock (e.g., combining hot part+cold insert to provide a tight fit at room temperature)
- Using inserts to assist in warping
- Manufacturing the inserts via alternate means, e.g., a standard steel pin
- Using non-axis-aligned inserts
- Using inserts that may not actually fully "insert" into another part, but may instead snap together
- Pausing printing mid-fabrication so that one or more inserts may be placed internally in a part, and resuming fabrication once the insert(s) have been correctly placed

OTHER EMBODIMENTS

Incorporation by reference is hereby made to U.S. Pat. Nos. 10,076,876, 9,149,988, 9,579,851, 9,694,544, 9,370,896, 9,539,762, 9,186,846, 10,000,011, 10,464,131, 9,186,848, 9,688,028, 9,815,268, 10,800,108, 10,814,558, 10,828,698, 10,953,609, U.S. Patent Application Publication No. 2016/0107379, U.S. Patent Application Publication No. 2019/0009472, U.S. Patent Application Publication No. 2020/0114422, U.S. Patent Application Publication No. 2020/0361155, U.S. Patent Application Publication No. 2020/0371509, and U.S. Provisional Patent Application No. 63/138,987 in their entireties.

Although this invention has been described with respect to certain specific exemplary embodiments, many additional modifications and variations will be apparent to those skilled in the art in light of this disclosure. For instance, while reference has been made to an X-Y Cartesian coordinate system, it will be appreciated that the aspects of the invention may be applicable to other coordinate system types (e.g., radial). It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the foregoing description.

What is claimed is:

1. An apparatus comprising:
at least one processor; and
at least one memory,
wherein the at least one memory stores computer-readable instructions which, when executed by the at least one processor, cause the processor to:
control a 3D printer to perform a first 3D print operation to print one or more first layers of a part to form a partial part, the partial part being oriented at a first orientation;
determine whether the partial part has been reoriented to a second orientation different from the first orientation; and
after determining that the partial part has been reoriented to the second orientation, control the 3D printer to perform a second 3D print operation to print one or more second layers of the part on the partial part oriented at the second orientation.

2. The apparatus of claim 1, wherein the one or more second layers includes a reinforcement layer.

3. The apparatus of claim 2, wherein the reinforcement layer is made of one or more of continuous carbon fiber, glass fiber, Kevlar fiber, and basalt fiber.

4. The apparatus of claim 1, wherein the one or more second layers includes a planarizing layer.

5. The apparatus of claim 2, wherein the reinforcement layer is made of continuous fiber.

6. The apparatus of claim 1, wherein the determining whether the partial part has been reoriented to the second orientation includes:
receiving measurement data based on a measurement performed on the partial part by a measurement component; and
determining, based on the measurement data, whether the partial part has been reoriented to the second orientation.

7. An apparatus comprising:
at least one processor; and
at least one memory,
wherein the at least one memory stores computer-readable instructions which, when executed by the at least one processor, cause the processor to:
control a 3D printer to perform a first 3D print operation to print an alignment component;
control the 3D printer to perform a second 3D print operation to print one or more first layers of a part to form a partial part, the partial part being oriented at a first orientation;
control re-orientation of the partial part to a second orientation, using the alignment component; and
after determining that the partial part has been reoriented to the second orientation, control the 3D printer to perform a third 3D print operation to print one or more second layers of the part on the partial part oriented at the second orientation.

8. The apparatus of claim 7, wherein the controlling the re-orientation of the partial part includes instructing a user to re-orient the partial part using the alignment component.

9. A method comprising:

controlling a 3D printer to perform a first 3D print operation to print one or more first layers of a part to form a partial part, the partial part being oriented at a first orientation;

determining whether the partial part has been reoriented to a second orientation different from the first orientation; and after determining that the partial part has been reoriented to the second orientation, controlling a 3D printer to perform a second 3D print operation to print one or more second layers of the part on the partial part oriented at the second orientation.

10. The method of claim 9, wherein the one or more second layers includes a reinforcement layer.

11. The method of claim 10, wherein the reinforcement layer is made of continuous fiber.

12. The method of claim 9, wherein the one or more second layers includes a planarizing layer.

13. The method of claim 9, wherein the determining whether the partial part has been reoriented to the second orientation includes:

receiving measurement data based on a measurement performed on the partial part by a measurement component; and determining, based on the measurement data, whether the partial part has been reoriented to the second orientation.

14. The method of claim 9, further comprising securing the partial part, reoriented to a second orientation, to a build platen.

15. The method of claim 14, wherein the securing includes applying an adhesive.

16. A method of 3D printing an object, comprising steps of:

receiving design information corresponding to an object to be generated by a 3D printing operation;

generating a finite element analysis of the object according to the design information to identify areas of stress within the object;

iterating redesign information including reinforcement strategy for the object, comprising:

forming printed layers parallel with a print bed surface an X-Y surface;

reorienting portions of the object to orientations beyond the X-Y surface orientation; and forming one or more reinforcement layers on the orientations beyond the X-Y surface orientation.

17. The apparatus according to claim 1, wherein the computer readable instructions, when executed, cause the processor to: instruct a user to re-orient the part from the first orientation to the second orientation after printing one or more first layers of the part.

18. The apparatus according to claim 17, wherein re-orienting the part comprises rotating the part.

* * * * *